United States Patent [19]
Lambert

[11] 3,866,789
[45] Feb. 18, 1975

[54] VENT PLUG FOR GEAR CASE

[75] Inventor: George M. Lambert, Columbus, Ind.

[73] Assignee: Reliance Electric Company, Cleveland, Ohio

[22] Filed: Jan. 16, 1974

[21] Appl. No.: 433,730

[52] U.S. Cl............................................. 220/44 R
[51] Int. Cl............................................ B65d 51/16
[58] Field of Search............. 220/44 R, 44 A, 44 C; 137/525.1, 525.3, 493

[56] References Cited
UNITED STATES PATENTS

| | | | |
|---|---|---|---|
| 2,644,609 | 7/1953 | Foss | 220/44 R |
| 2,644,610 | 7/1953 | Work | 220/44 R |
| 2,840,105 | 6/1958 | Routledge | 220/44 R X |
| 3,368,710 | 2/1968 | King | 220/44 R |
| 3,385,468 | 5/1968 | Fleming et al. | 220/44 A |
| 3,406,862 | 10/1968 | Donaldson | 220/44 C |
| 3,422,982 | 1/1969 | Terwoerds et al. | 220/44 A |
| 3,430,643 | 3/1969 | Heiland | 220/44 R X |
| 3,621,876 | 11/1971 | Campbell | 137/525.1 |

*Primary Examiner*—John Petrakes
*Attorney, Agent, or Firm*—William R. Coffey

[57] ABSTRACT

A vent plug for use with a gear case containing lubrication oil and rotating transmission elements and having an opening in its side wall, the plug comprising a fitting adapted to engage and close the opening. The fitting has an engaging body portion proportioned and designed to be disposed in the wall opening and an outer body portion proportioned and designed to extend outwardly from the wall. The fitting is provided with an axially extending bore entering the inner end of the engaging body portion and terminating with a closed end in the outer body portion, the bore having an outer section of a first diameter and an inner section of a second and greater diameter. The inner section of the bore terminates in the outer body portion, and the fitting also has, in the outer body portion, a transaxially extending opening venting the outer section of the bore and a second transaxially extending opening venting the inner section of the bore. A tube is concentrically and axially disposed in the bore to extend axially into the interior of the case to provide communication between the outer bore section and the interior of the case. The tube has an outer diameter less than the said second diameter to provide an annular passageway communicating between the inner bore section and the interior of the case.

7 Claims, 3 Drawing Figures

PATENTED FEB 18 1975　　3,866,789

VENT PLUG FOR GEAR CASE

The present invention relates to vent plugs and more particularly to the provision of a vent plug for use with a gear case containing lubrication oil and rotating transmission elements and having an opening in its side wall.

The functional design of a vent plug for gear cases in which minimum lubrication levels are a critical prerequisite to proper lubrication is extremely important. Oil losses through such a vent plug or a breather, as it is sometimes called, can be a burdensome problem if the oil loss becomes excessive.

In such a gear casing, a significant quantity of heat is generated by the engagement or the meshing of rotating elements such as worm and worm gears. This increase in the internal heat, in turn, causes a proportional increase in the air pressure within the gear casing. The movement of the rotatable elements causes the lubricant to splatter about in the casing forming bubbles. Some lubrication particles in the form of such bubbles will often be conveyed out through conventional vent plugs. Because of such passage of oil through the vent plugs, conventional vent plugs will often become clogged and thereby hamper the breathing function.

Various types of venting plugs and venting devices have been suggested by the prior art. Representative patents showing such prior art devices are U.S. Pats. Nos. 1,865,764; 2,644,609; 2,840,105; 3,385,468; 3,406,862; 3,422,982; 3,454,182; 3,527,376; and 3,621,876.

The vent plug of the present invention is a significant improvement over such prior art vent plugs because it provides two separate venting passageways, both of which would have to become clogged before the vent plug would become inoperative. One of the passageways is defined primarily by a tube which extends a considerable distance into the gear casing and the open end of which is placed in such a position that the oil will not be splashed directly therein. This tube leads to a venting passageway formed in the outer body portion of the fitting of the vent plug. The second passageway is an annular passageway formed concentrically about the outer body portion of the tube and leading also to a vent opening in the fitting. This annular passageway, which opens into the interior of the gear casing, is preferably protected by means of a splash shield carried by the tube. This splash shield may be a washer mounted upon the tube for selective adjustable movement toward and away from the open end of the annular passageway.

Since the second passageway is an annular passageway leading from the interior of the gear casing to the vent opening in the outer body portion of the fitting, it is unlikely that the annular passageway will ever become entirely clogged to prevent the passage of air therethrough. Since the vent openings in the plug fitting, i.e., the openings venting the tube and the annular passageway are upwardly directed, any oil vapors or bubbles which condense in the tube or the annular passageway will generally run back into the gear casing.

It is an object of my present invention, therefore, to provide a vent plug for use with a gear case containing lubrication oil and rotating transmission elements and having an opening in its side wall, the plug comprising a fitting adapted to engage and close the opening. The fitting has an engaging body portion proportioned and designed to be disposed in the wall opening and an outer body portion proportioned and designed to extend outwardly from the wall. The fitting is provided with an axially extending bore entering the inner end of the engaging body portion and terminating with a closed end in the outer body portion. This bore has an outer section of a first diameter and an inner section of a second and greater diameter with the inner section of the bore terminating in the outer body portion of the fitting. The fitting also has, in the outer body portion, the transaxially extending opening venting the outer section of the bore and a second transaxially extending opening venting the inner section of the bore. These openings are preferably upwardly directed as mentioned above. Then, a tube is concentrically and axially disposed in the bore to extend axially into the interior of the case to provide communication between the outer bore section and the interior of the case, the tube having an outer diameter less than the said second diameter to provide an annular passageway about the tube communicating between the inner bore section and the interior of the case. In a preferred embodiment, the bore has an intermediate section between the outer and inner section, the intermediate section having a diameter greater than the first diameter and less than the second diameter, the tube having its axially outer end pressed into the intermediate section. A splash shield is preferably mounted on the tube to be in the interior of the case to prevent oil from splashing into the annular passageway.

As will be more particularly described hereinafter, the distal end of the tube, i.e., its axially inner end, is positioned within the gear case and relative to the rotating components such that the oil will not be splashed directly into the open end of the tube.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
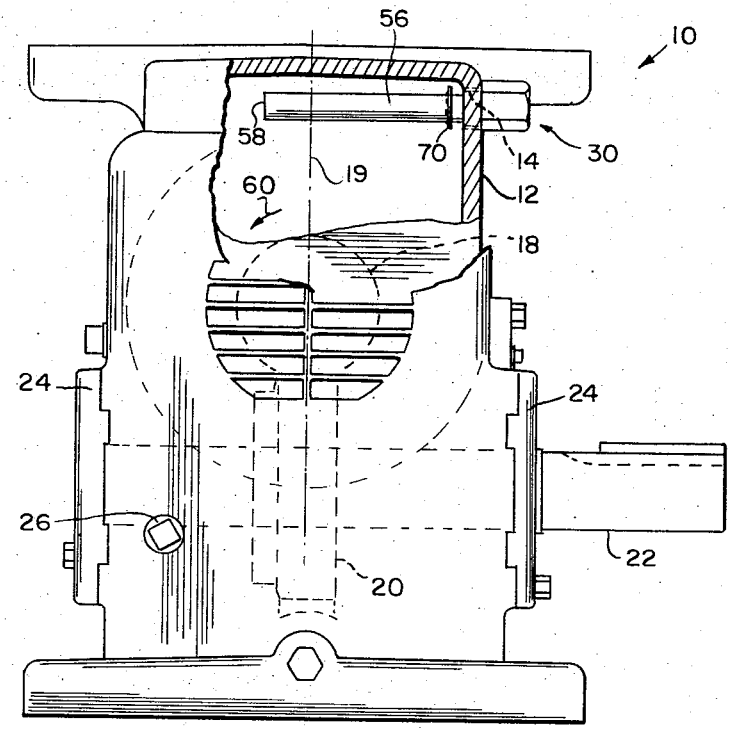
FIG. 1 is an elevational view, partially cut away and sectioned, of a gear casing in accordance with the present invention.
Figure 2:
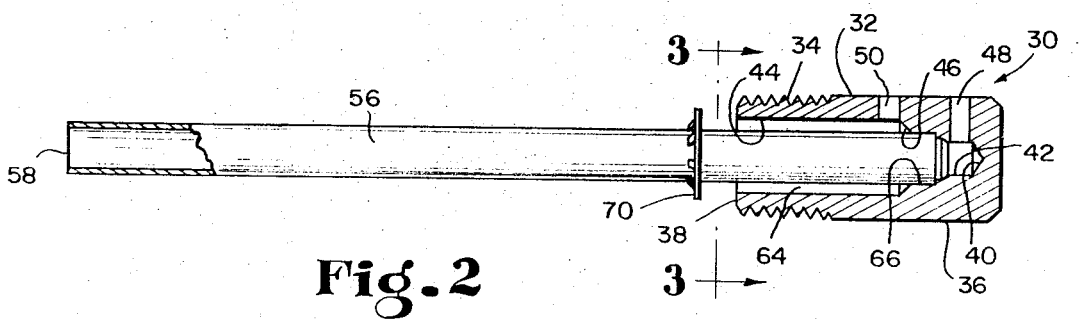
FIG. 2 is an enlarged sectional view of the vent plug of the present invention.
Figure 3:
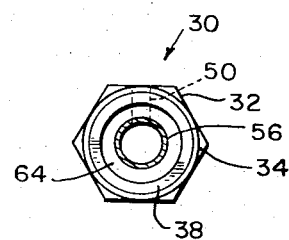
FIG. 3 is a sectional view taken along the lines 3—3 in FIG. 2.

Referring now to the drawings, it will be seen that I have shown a gear case 10 having a side wall 12 with a threaded opening 14 in the upper portion thereof. The gear case 10 contains rotating transmission elements, and particularly a worm 18, the horizontal rotational axis of which lies in a vertically extending plane indicated by the center line 19. The worm is meshed with and drives a worm gear 20 mounted on an output shaft 22 which is conventionally supported in bearings and end plates 24. Conventionally, the case 10 contains lubricating oil, and I have shown an oil level plug 26. Thus, the worm gear 20 is constantly bathed in oil.

The vent plug 30 of the present invention comprises a fitting 32 having a threaded engaging body portion 34 proportioned and designed to engage the threaded wall opening 14 and an outer body portion 36 proportioned and designed to extend outwardly from the wall 12. The fitting is provided with an axially extending bore entering the inner end 38 of the engaging body portion 34 and terminating with a closed end 40 in the outer body portion 36. The illustrative bore has an outer section 42 of a first diameter and an inner section 44 of a second and greater diameter, the inner section of the bore terminating as indicated at 46 in the outer body portion 36. The fitting 32 also has, in the outer body portion 36, a transaxially and upwardly extending opening 48 venting the outer section 42 of the bore and a second transaxially and upwardly extending opening 50 venting the inner section 44 of the bore.

A tube 56 is concentrically and axially disposed in the bore to extend axially into the interior of the case to provide communication between the outer bore section 42 and the interior of the case. This tube 56 has an outer diameter less than the said second diameter of the bore section 44 to define an annular passageway 64 communicating between the inner bore section and the interior of the case.

Preferably, as illustrated in FIG. 1, the distal end 58 of the tube 56 is disposed to the left of the center plane 19 such that, when the worm 18 rotates in the direction of the arrow 60, the worm will not have a tendency to throw oil into the open end of the tube 56.

In the illustrative and preferred embodiment, the bore has an intermediate section 66 between the outer section 42 and inner section 44, the intermediate section having a diameter greater than the said first diameter and less than the said second diameter. Then, the axially outer end of the tube is pressed into this intermediate section 66. Then, as a splash shield, a washer 70 is mounted upon the tube 56 frictionally to engage the tube to be selectively axially adjustable toward and away from the fitting 32.

Thus, the interior of the case 10 is vented through two separate passageways. The first passageway is through the tube 56, the outer section 42 of the bore and the vent opening 48. The other passageway is through the annular space 64 and the vent opening 50. It is highly unlikely that the annular space 64 will ever be completely clogged up because the condensing oil which might be caught therein will tend to run to the bottom of the annular space to drip back into the casing. The splash shield 70 can, of course, be adjusted relative to the inner end 38 of the fitting to prevent the direct splashing of oil into the annular space 64. Then, the distal end 58 of the tube 56 is disposed a considerable distance from the inner end 38 such that the two separate passageways have points of entry separated by such a considerable distance. This separation greatly increases the probability that the two separate passageways will never be simultaneously clogged.

While I have shown and described the vent plug 30 in the side wall 12, it will be appreciated that the vent plug may be disposed, for instance, in the top wall to extend downwardly into the case 10.

I claim:

1. A vent plug for use with a gear case containing lubrication oil and rotating transmission elements and having an opening in its wall, said plug comprising a fitting adapted to engage and close said opening, said fitting having an engaging body portion proportioned and designed to be disposed in the wall opening and an outer body portion proportioned and designed to extend outwardly from the wall, said fitting being provided with an axially extending bore entering the inner end of said engaging body portion and terminating with a closed end in said outer body portion, said bore having an outer section of a first diameter and an inner section of a second and greater diameter, said inner section of said bore terminating in said outer body portion, said fitting also having, in said outer body portion, a transaxially extending opening venting the outer section of said bore and a second transaxially extending opening venting the inner section of said bore, and a tube concentrically and axially disposed in said bore and extending axially into the interior of the case to provide communication between the outer bore section and said interior, said tube having an outer diameter less than the said second diameter to provide an annular passageway communicating between said inner bore section and the interior of the case.

2. The vent plug of claim 1 in which said bore has an intermediate section between said outer and inner sections, said intermediate section having a diameter greater than said first diameter and less than said second diameter, said tube having its axially outer end pressed into said intermediate section.

3. The vent plug of claim 1 including a splash shield mounted on said tube to be in the interior of the case to prevent oil from splashing into said annular passageway.

4. The vent plug of claim 3 in which said shield is a washer frictionally engaging said tube to be selectively axially adjustable toward and away from said fitting.

5. The vent plug of claim 4 in which said bore has an intermediate section between said outer and inner sections, said intermediate section having a diameter greater than said first diameter and less than said second diameter, said tube having its axially outer end pressed into said intermediate section.

6. The vent plug of claim 3 in which said bore has an intermediate section between said outer and inner sections, said intermediate section having a diameter greater than said first diameter and less than said second diameter, said tube having its axially outer end pressed into said intermediate section.

7. The vent plug of claim 1 in which said transaxially extending vent openings are upwardly directed.

* * * * *